United States Patent
Andersen et al.

(10) Patent No.: US 8,568,220 B2
(45) Date of Patent: Oct. 29, 2013

(54) LIABILITY MANAGEMENT SYSTEM

(75) Inventors: Iain Johnson Andersen, Hertfordshire (GB); Matthew James Searle, Hertfordshire (GB); David Glen Jeffery, London (GB); Steven John High, Surrey (GB)

(73) Assignee: The Sporting Exchange Ltd., London (GB)

( * ) Notice: Subject to any disclaimer, the term of this patent is extended or adjusted under 35 U.S.C. 154(b) by 573 days.

(21) Appl. No.: 12/523,571

(22) PCT Filed: Jan. 18, 2008

(86) PCT No.: PCT/GB2008/050035
§ 371 (c)(1),
(2), (4) Date: Dec. 29, 2009

(87) PCT Pub. No.: WO2008/087455
PCT Pub. Date: Jul. 24, 2008

(65) Prior Publication Data
US 2010/0093430 A1   Apr. 15, 2010

(30) Foreign Application Priority Data

Jan. 19, 2007   (GB) .................................. 0701051.5

(51) Int. Cl.
*A63F 9/24* (2006.01)
*A63F 13/00* (2006.01)

(52) U.S. Cl.
USPC .................. 463/25; 463/21; 463/22; 463/23; 705/35; 705/36 R; 705/37; 705/80

(58) Field of Classification Search
USPC ............. 463/25, 21–23; 705/80, 35, 36 R, 37
See application file for complete search history.

(56) References Cited

U.S. PATENT DOCUMENTS

| | | | | |
|---|---|---|---|---|
| 5,575,474 | A * | 11/1996 | Rossides | 463/26 |
| 7,103,580 | B1 * | 9/2006 | Batachia et al. | 705/80 |
| 7,171,385 | B1 * | 1/2007 | Dembo et al. | 705/36 R |
| 2001/0041612 | A1 * | 11/2001 | Garahi et al. | 463/29 |
| 2004/0015429 | A1 * | 1/2004 | Tighe et al. | 705/37 |
| 2004/0243495 | A1 * | 12/2004 | Karp | 705/35 |
| 2007/0088661 | A1 * | 4/2007 | De Verdier et al. | 705/80 |

* cited by examiner

*Primary Examiner* — Arthur O. Hall
*Assistant Examiner* — Jasson Yoo
(74) *Attorney, Agent, or Firm* — Ropes & Gray LLP

(57) ABSTRACT

A method of determining liability for a plurality of multiples bets placed via a computerised betting system, each multiples bet comprising a single transaction on a plurality of outcomes selected from a group of possible transactions, the method comprising selecting a most popular transaction from the group, evaluating all other transactions within the group on the basis that the most popular transaction is a winning transaction to produce a first result, evaluating all other transactions within the group on the basis that the most popular transaction is not a winning transaction to produce a second result and selecting one of the first and second results that indicates the worst case liability.

13 Claims, 6 Drawing Sheets

LIABILITY MANAGEMENT SYSTEM

RELATED APPLICATIONS

This application is a national stage filing under 35 U.S.C. 371 of International Application No. PCT/GB2008/050035, filed Jan. 18, 2008, which claims the benefit of Great Britain Application No. GB 0701051.5, filed Jan. 19, 2007, the specifications of which are incorporated by reference herein. International Application No. PCT/GB2008/050035 was published under PCT Article 21(2) in English.

FIELD OF THE INVENTION

The present invention relates to software for providing liability assessment and risk management, in particular in relation to multiples betting.

BACKGROUND

A multiple, or accumulator bet, is a bet on a number of outcomes occurring. A multiple bet wins if, and only if, all the selected outcomes occur. Typically, the separate odds for each of the outcomes are multiplied together to give odds for all outcomes to occur together. For example, a user might bet on Newcastle, Chelsea and Liverpool all to win their respective matches. If the odds for each, expressed as digital odds, were 2.5, 1.8, 2.9, then the user might bet £10 at odds of 13.05 (2.5×1.8×2.9) that all three win. If they all win then the user wins £120.50 and if one or more fail to win the user will lose £10. The attraction for users is that they get larger odds by combining several favoured outcomes, where the odds are short.

Since it is impossible for a bookmaker to hedge the risk on an individual multiple bet, the bookmaker has to accept some level of risk. For example, a user may place a £15 bet on a combination of 8 outcomes. If all 8 occur, then the bookmaker may, for example, have to pay out £47,000, but if one does not occur the bookmaker will win £15. There is no way to place a single bet, or combination of single bets, that cover the potential payout.

The inventors have determined that where liability is looked at over a very large number of multiple bets, sufficient information can be provided to place hedging bets that can significantly reduce the risk involved.

SUMMARY OF THE INVENTION

According to the invention, there is provided a method of determining liability for a plurality of multiples bets placed via a computerised betting system, each multiples bet comprising a single transaction on a plurality of outcomes selected from a group of possible transactions, the method comprising:
 (a) selecting a most popular transaction from the group;
 (b) evaluating all other transactions within the group on the basis that the most popular transaction is a winning transaction to produce a first result;
 (c) evaluating all other transactions within the group on the basis that the most popular transaction is not a winning transaction to produce a second result; and
 (d) selecting one of the first and second results that indicates the worst case liability.

The method may further comprise determining if the worst case liability exceeds a predetermined value and, if so, refusing a submitted bet.

The method may further comprise selecting a next most popular transaction from the group and repeating steps (b) and (c) for the next most popular transaction based on the transaction previously determined to result in the worst case liability, to provide third and fourth results respectively.

The method may further comprise determining the worst case liability as being the worst case liability among the third and fourth results, and the one of the first and second results that does not comprise the worst case liability.

The method may further comprise receiving a new bet for which a worst case liability has previously been calculated, and recalculating the worst case liability to take the new bet into account.

The new bet may comprise a bet placed by a user or a hedging bet placed by an operator of the management system.

According to the invention, there is further provided a liability management system for determining liability for a plurality of multiples bets placed via a computerised betting system, each multiples bet comprising a single transaction on a plurality of outcomes selected from a group of possible transactions, the system comprising:
 means for selecting a most popular transaction from the group;
 means for evaluating all other transactions within the group on the basis that the most popular transaction is a winning transaction to produce a first result;
 means for evaluating all other transactions within the group on the basis that the most popular transaction is not a winning transaction to produce a second result; and
 means for selecting one of the first and second results that indicates the worst case liability.

The system may be arranged to select a next most popular transaction from the group and to repeat the steps of evaluating all other transactions, the evaluation being based on the one of the first and second results that provides the worst case liability.

The system may further comprise means for recalculating the worst case liabilities for a new bet to be placed on an outcome.

The system may be arranged to compare the worst case liability with a predetermined liability limit, and to reject the bet if the worst case liability exceeds the liability limit.

According to the invention, there is still further provided a liability management system comprising:
 a plurality of liability management components;
 a liability engine; and
 a plurality of group processors controlled by the liability engine and arranged to calculate a liability for each of a plurality of groups;
 wherein each of the plurality of liability management components is arranged to receive a combination bet on a plurality of outcomes for a given group and to request the liability engine to determine whether the bet can be accepted, the liability engine being arranged to control one of the plurality of processors to determine the worst case liability for the bet.

The liability engine may be arranged to reject the bet in the event that the determined worst case liability exceeds a predetermined threshold.

The system may be arranged to provide information relating to the placement of a hedging bet to reduce the worst case liability.

DETAILED DESCRIPTION

Figure 1:
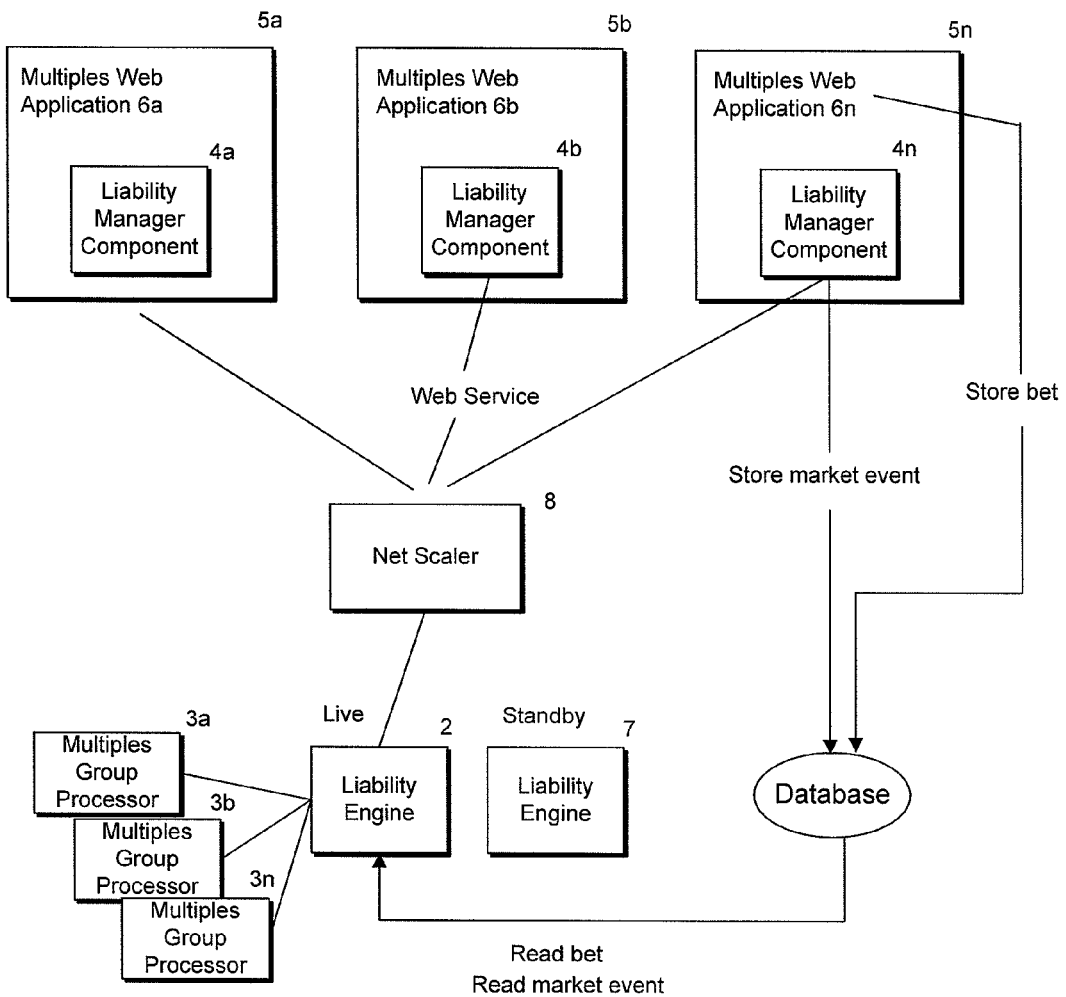
FIG. 1 is an illustration of a system according to the invention.

Referring to FIG. 1, a liability management system 1 according to an example of the invention includes a liability engine 2, which in turn manages a set of multiples group processors 3a . . . n, each of which handles the bets placed in a given multiples group. Multiple bets are available on a group of events, for example on a competition such as Wimbledon 2007, or on a set of games over a particular period, such as weekend soccer. This gives a discrete set of manageable outcomes.

For each multiples group, its multiples group processor calculates the worst case result for the group, this being the set of outcomes or settlements for the markets in the group that will cause the greatest payout, or liability, given the bets placed on that group. This, in conjunction with a liability limit, is used to decide whether further bets should be accepted for that group. This is an ongoing process, as the liability for a multiples group changes every time a bet is placed. For any individual bet, the multiples group processor may reject the bet if it would take the multiples group beyond the liability limit.

The multiples group processor also provides statistical information for a given multiple group. This enables a multiples group account manager to determine the state of the multiples group and whether it requires hedging bets to be placed to reduce the worst case liability for the group.

Referring again to FIG. 1, the liability management system 1 further comprises one or more liability manager components 4a . . . n, each of which is deployed on a multiples web site node 5a . . . n, that runs a multiples web application 6a . . . n, to permit users to place bets. A pair of liability engine modules 2, 7 are provided, only one of which is live at any given time. The liability manager components 4a . . . n are connected to the live liability engine 2 via a NetScaler module 8, which routes direct calls via a web service to the live engine in the pair, and is responsible for detecting a liability engine failure and swapping over to the failover instance in the pair. The liability engine is also connected to the liability manager components via a database 9, which permits asynchronous communications between the liability manager components and the liability engines.

The liability manager components use API calls to tell the multiples group processors 3a . . . n about the multiples groups that are set up in a multiples betting system, such as what markets are included in each group. They are also used to inform the multiples group processors about market events, such as settlement and runner (competitor) removal from a competition. The data for the API calls is written to the database 9 by the liability manager component.

Bets on multiples groups are submitted by users using the multiples web applications and are stored in the database 9 for processing.

Both the live and standby liability engines periodically poll the database for new messages and read the multiples group set up/market event/bet placement data.

In general terms, it would be desirable for the multiples group processors to calculate which of the bets that have been taken could win together, calculate the worst combination of results that could occur and report the potential liability. However, there are generally too many combinations to calculate a precise answer. Therefore, the software is arranged to calculate a pessimistic estimate, which is worse than the actual worst case, and report that.

When a bet is placed, a check is made on what effect the bet has on the overall position of the multiple group. The liability manager component makes a "Can accept liability" call via the web service to the liability engine, to ensure that the multiples group for the bet has enough exposure left to accept the bet. If this call returns "No", the bet is rejected.

Figure 2:
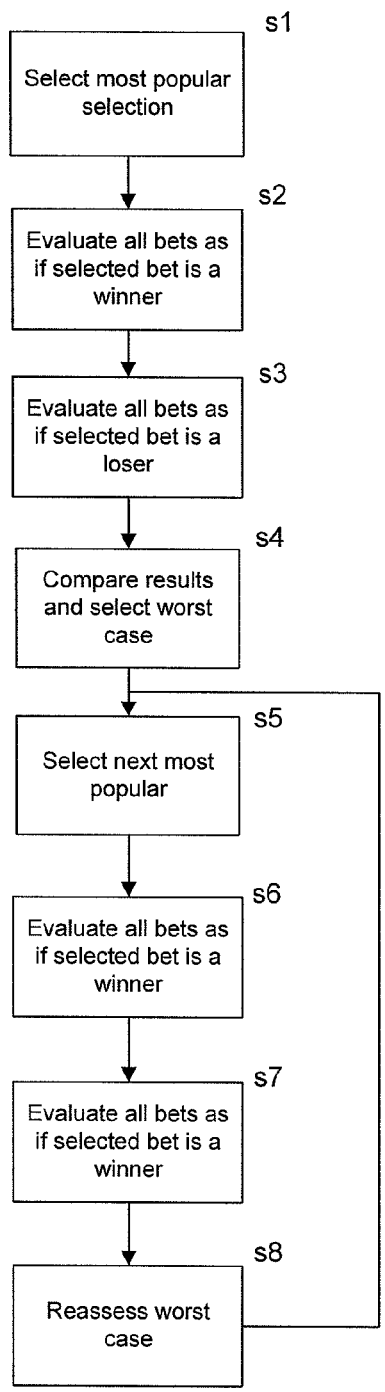
FIG. 2 is a flowchart illustrating the operation of a system according to FIG. 1.

In order to evaluate the worst case liability, the multiples group processor for each group uses a procedure that is explained below, with reference to FIG. 2. For the purposes of this explanation, it is assumed that there are 10 soccer matches in a group designated M1-M10, each of which has three possible outcomes, namely a home win (designated 1), an away win (designated 2) and a draw (designated X).

Processing starts with the most popular selection in the group (step s1). For example, an away win in match 2 (M2-2) is assumed to be the most popular selection, featuring in the most multiples bet. Every bet placed is evaluated on the assumption that the selected bet is a winner (step s2). In other words, every multiple that has M2-2 selected is evaluated as a winner and every one that has M2-1 or M2-X selected is evaluated as a loser. Then the assumption that the selection is not a winner is evaluated (step s3). In other words, it is assumed that M2-2 is a loser and that one of M2-1 or M2-X happens.

The evaluation is for example based on multiplication of odds maintained for the individual matches. In this embodiment, the liability management software is run in conjunction with a betting exchange system, in which odds are available for individual events. The current exchange odds are used as an indicator of the probability of an outcome occurring. The expected return for each multiples bet can be evaluated, by assessing the probability of the bet winning against the return if it wins and the stake if it does not win. Summing the expected value of each multiples bet gives an overall expected value.

Figure 3:
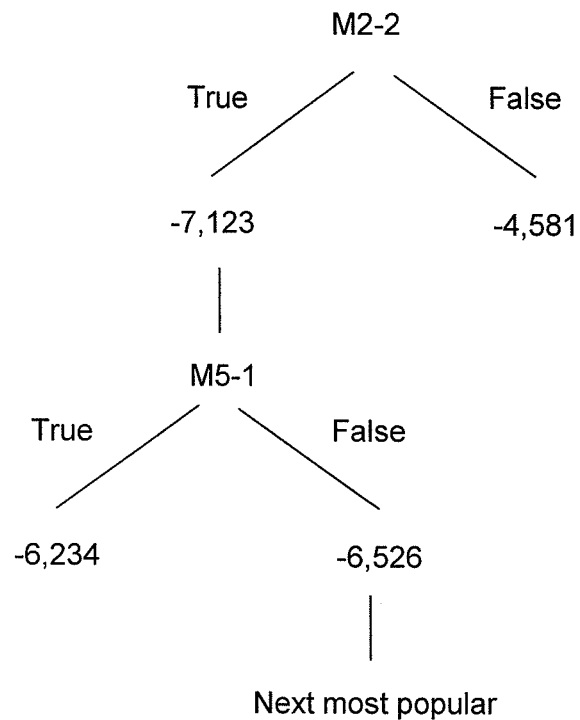
FIG. 3 is an illustration of a binary decision tree providing worst case liability information in accordance with the invention.

The result of this process is shown in the tree diagram of FIG. 3. Example figures for the outcome of the evaluation are provided, showing that in this example it is assumed that M2-2 is the worst case, at −£7123, resulting in the greater liability, compared with −£4581 for NOT M2-2 i.e. M2-1 or M2-X.

Whichever is the worst case of the two is pursued (step s4). Then the next most popular selection is selected (step s5) and assumed to be a winner. In this example, we assume it is a home win in match 5(M5-1). All multiples that feature both M2-2 and M5-1 are evaluated as winners (step s6), with all those featuring M2-1, M2-X, M5-2, M5-X as losers. This is assumed to come up with a value −£6234. Next, the process evaluates bets assuming M5-1 does not occur (step s7), which is assumed to produce the value −£6526. The worst case is then reassessed (step s8). This can be either:
NOT M2-2, or
M2-2 and M5-1, or
M2-2 and NOT M5-1

In this example, it is M2-2 and NOT M5-1. The process is then repeated by selecting and evaluating the next most popular selection.

It will be apparent from FIG. 3 that the result is a binary decision tree where the worst case node can be expanded on at any open node.

Figure 4:
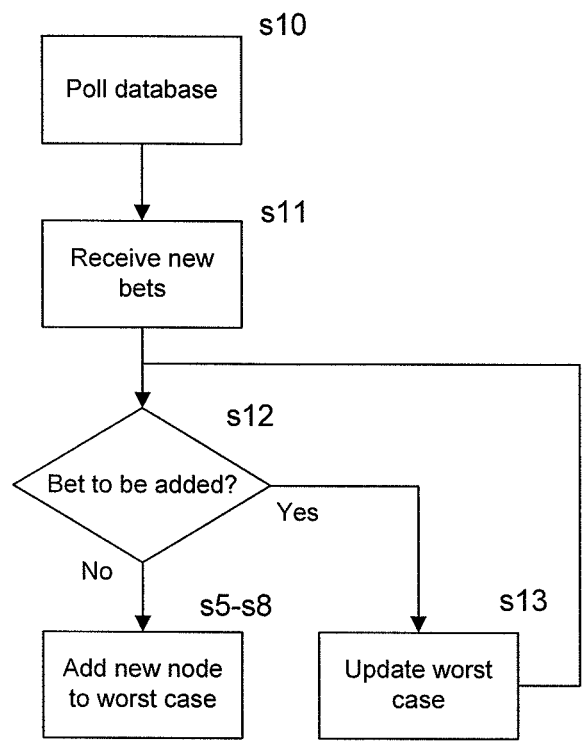
FIG. 4 is a flow chart illustrating the continuing process of adding bets for the purposes of a liability calculation.

As new bets come in, they are added to the relevant tree nodes and all the worst cases are updated. As mentioned above, and referring to FIG. 4, the liability engine continues to periodically poll the database for new bets (s10) and will receive all new bets submitted since the last poll time (step s11). These bets may include hedging bets placed in response to previous information from the liability management system. If there is a bet to be added to an existing multiple (step s12), this is dealt with (step s13) before expanding the tree structure with a new multiple (step s14). For example, a bet of £200 is placed at digital odds of 2.5 backing M2-2 and M5-1 to occur. This combination has already been evaluated, as shown in FIG. 3, so there is no need to add a new node to the tree structure, but the existing worst case values need to be updated (step s13).

Figure 5:
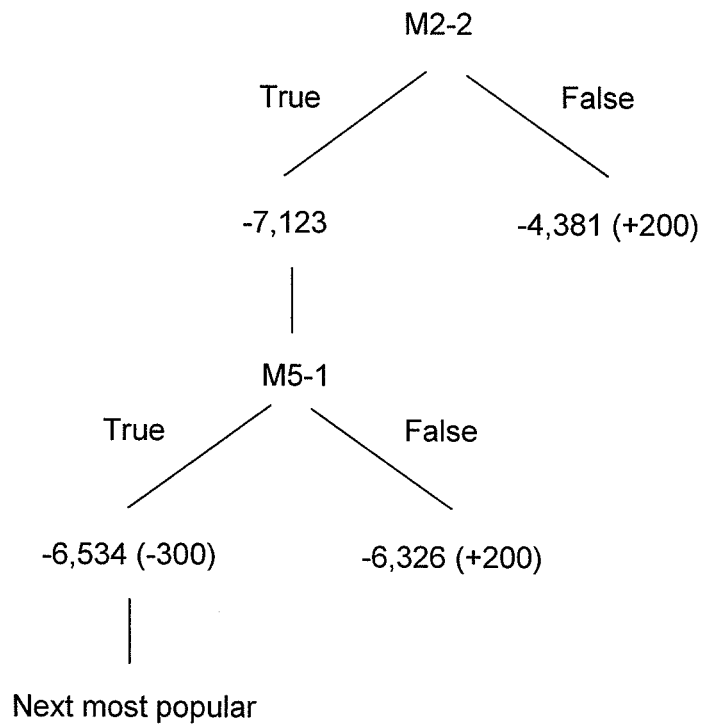
FIG. 5 is an illustration of a binary decision tree providing worst case liability information in accordance with the invention, with updated worst case information.

Referring to FIG. 5, the calculated value for M2-2 and M5-1 is recalculated to increase the liability by £300, since that is the additional liability that will result if the bet wins. The liability for each of the other open nodes (NOT M2-2, and M2-2 and NOT M5-1) is reduced by £200, since if the bet does not win, the user forfeits the stake of £200. As a result, the worst case changes from M2-2 and NOT M5-1 to M2-2 and M5-1. The next most popular selection will therefore be branched from the latter node.

By systematically working through as many cases as possible, the liability management system provides a worst case that is always worse than the actual worst case, but the estimate is always improving as more selections are evaluated.

Example 1

Betting on a sample of 14 games in a football (soccer) competition week was simulated taking 5,000 bets which were different combinations of the games. Reasonable assumptions were made about how the bets would be divided between the possible selections and what stakes and odds would be used. The liability management tool was run against this data to show how the liability developed.

Figure 6:
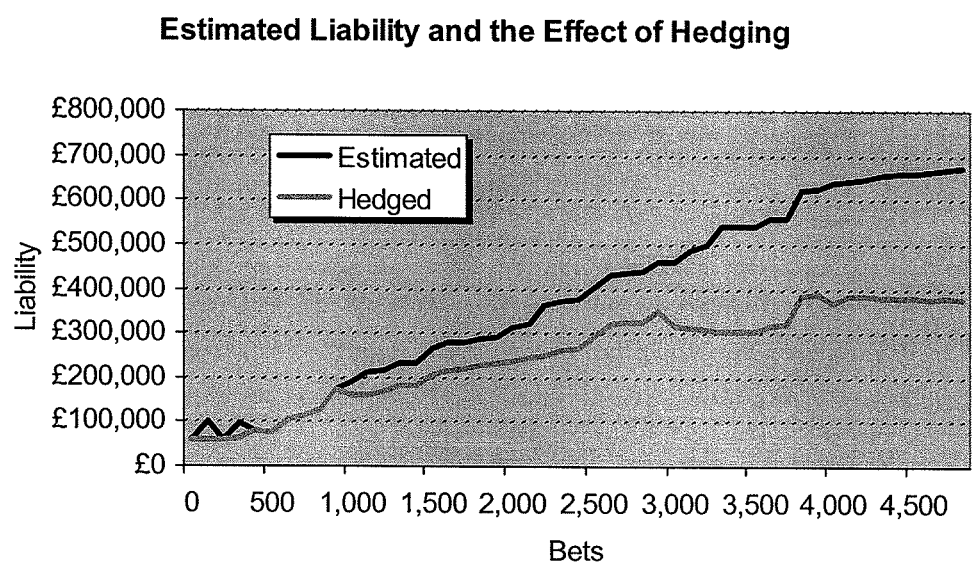
FIG. 6 is a graph illustrating a simulation of the liability management tool according to the invention.

If all the possible payouts from the 5,000 bets were simply added together, a liability of £12 m would result. The estimate is shown in the graph of FIG. 6—the liability reaches only £0.65 m. Another simulation was then run, where 5 hedge bets were placed—one after every 1,000 multiples. By doing this, the liability management tool could further manage the liability, so it never exceeds £0.4 m.

While embodiments of the invention have been described by way of example, it will be appreciated that many modifications and variations are possible that still fall within the scope of the invention.

The invention claimed is:

1. A method of determining liability for a plurality of multiple bets placed via a computerized betting system, each multiple bet being a bet on a plurality of selected outcomes occurring in a plurality of respective different events, with each outcome of the plurality of outcomes within the multiple bet corresponding to a different event, wherein a multiple bet is a winning multiple bet if and only if all the selected outcomes within the multiple bet occur, the method comprising:

receiving a plurality of multiple bets from a plurality of users;

determining from said received plurality of multiple bets, a group of event-outcome selections selected in the plurality of received multiple bets;

determining for each event-outcome selection in said determined group of event-outcome selections, the number of received multiple bets in which that event-outcome selection is selected;

selecting, using the computerized betting system, a most popular event-outcome selection from the group of possible event-outcome selections, the most popular event-outcome selection being the event-outcome selection selected in the highest number of received multiple bets;

evaluating, using the computerized betting system, all other event-outcome selections within the group of possible event-outcome selections on the basis that the most popular event-outcome selection is a winning outcome to produce a first result, the first result representing a liability associated with all the multiple bets that include the most popular event-outcome selection being winning multiple bets;

evaluating, using the computerized betting system, all other event-outcome selections within the group of possible event-outcome selections on the basis that the most popular event-outcome selection is not a winning outcome to produce a second result, the second result representing a liability associated with all the multiple bets that include the most popular event-outcome selection being losing multiple bets; and selecting, using the computerized betting system, one of the first and second results that indicates the worst case liability.

2. A method according to claim 1, further comprising determining, using the computerized betting system, if the worst case liability exceeds a predetermined value and, if so, refusing a submitted bet.

3. A method according to claim 1, further comprising:

selecting, using the computerized betting system, a next most popular event-outcome selection from the group of possible event-outcome selections, the next most popular event-outcome selection being the event-outcome selection selected in a second highest number of the multiple bets from within all the event-outcome selections in the plurality of multiple bets;

evaluating, using the computerized betting system, all event-outcome selections other than the next most popular event-outcome selection within the group of possible event-outcome selections on the basis that the next most popular event-outcome selection is a winning outcome to produce a third result, the third result representing a liability associated with at least one of the multiple bets that include the next popular event-outcome selection being a winning multiple bet; and evaluating, using the computerized betting system, all event-outcome selections other than the next most popular event-outcome selection within the group of possible event-outcome selections on the basis that the next most popular event-outcome selection is not a winning outcome to produce a fourth result, the fourth result representing a liability associated with at least one of the multiple bets that include the next most popular event-outcome selection being a losing multiple bet.

4. A method according to claim 3, further comprising determining, using the computerized betting system, the worst case liability as being the worst case liability among the third and fourth results, and the one of the first and second results that does not comprise the worst case liability.

5. A method according to claim 1, further comprising receiving, using the computerized betting system, a new bet for which a worst case liability has previously been calculated, and recalculating the worst case liability to take the new bet into account.

6. A method according to claim 5, wherein the new bet comprises at least one of a bet placed by a user and a hedging bet placed by an operator of the management system.

7. A liability management system for determining liability for a plurality of multiple bets placed via a computerized betting system, each multiple bet being a bet on a plurality of selected outcomes occurring in a plurality of respective different events, with each outcome of the plurality of outcomes within the multiple bet corresponding to a different event, wherein a multiple bet is a winning multiple bet if and only if all the selected outcomes within the multiple bet occur, the system comprising:
- means for receiving a plurality of multiple bets from a plurality of users;
- means for determining from said received plurality of multiple bets, a group of event-outcome selections selected in the plurality of received multiple bets;
- means for determining for each event-outcome selection in said determined group of event-outcome selections, the number of received multiple bets in which that event-outcome selection is selected;
- means for selecting a most popular event-outcome selection from the group of possible event-outcome selections, the most popular event-outcome selection being the event-outcome selection selected in the highest number of received multiple bets;
- means for evaluating all other event-outcome selections within the group of possible event-outcome selections on the basis that the most popular event-outcome selection is a winning outcome to produce a first result, the first result representing a liability associated with all the multiple bets that include the most popular event-outcome selection being winning multiple bets;
- means for evaluating all other event-outcome selections within the group of possible event-outcome selections on the basis that the most popular event-outcome selection is not a winning outcome to produce a second result, the second result representing a liability associated with all the multiple bets that include the most popular event-outcome selection being losing multiple bets; and
- means for selecting one of the first and second results that indicates the worst case liability.

8. A system according to claim 7, further comprising:
- means for selecting a next most popular event-outcome selection from the group of possible event-outcome selections, the next most popular event-outcome selection being the event-outcome selection selected in a second highest number of the multiple bets from within all the event-outcome selections in the plurality of multiple bets;
- means for evaluating all event-outcome selections other than the next most popular event-outcome selection within the group on the basis that the next most popular event-outcome selection is a winning outcome to produce a third result, the third result representing a liability associated with at least one of the multiple bets that include the next popular event-outcome selection being a winning multiple bet; and
- means for evaluating all event-outcome selections other than the next most popular event-outcome selection within the group on the basis that the next most popular event-outcome selection is not a winning outcome to produce a fourth result, the fourth result representing a liability associated with at least one of the multiple bet that include the next most popular event-outcome selection being a losing multiple bet.

9. A system according to claim 7, further comprising means for recalculating the worst case liability for a new bet to be placed on an outcome.

10. A system according to claim 9 that is arranged to compare the worst case liability with a predetermined liability limit, and to reject the bet if the worst case liability exceeds the liability limit.

11. A liability management system for determining liability for a plurality of multiple bets placed via a computerized betting system, each multiple bet being a bet on a plurality of selected outcomes occurring in a plurality of respective different events, with each outcome of the plurality of outcomes within the multiple bet corresponding to a different event, wherein a multiple bet is a winning multiple bet if and only if all the selected outcomes within the multiple bet are winning occur, the system comprising:
- a processor arranged to receive a plurality of multiple bets from a plurality of users, determine from said received plurality of multiple bets, a group of event-outcome selections selected in the plurality of received multiple bets, determine for each event-outcome selection in said determined group of event-outcome selections, the number of received multiple bets in which that event-outcome selection is selected, select a most popular event-outcome selection from the group of possible event-outcome selections, the most popular event-outcome selection being the event-outcome selection selected in the highest number of received multiple bets; to evaluate all other event-outcome selections within the group of possible event-outcome selections on the basis that the most popular event-outcome selection is a winning outcome to produce a first result, the first result representing a liability associated with all the multiple bets that include the most popular event-outcome selection being winning multiple bets; to evaluate all other event-outcome selections within the group of possible event-outcome selections on the basis that the most popular event-outcome selection is not a winning outcome to produce a second result, the second result representing a liability associated with all the multiple bets that include the most popular event-outcome selection being losing multiple bets; and to select one of the first and second results that indicates the worst case liability.

12. A system according to claim 11, wherein the liability engine is arranged to reject the multiple bet in the event that the determined worst case liability exceeds a predetermined threshold.

13. A system according to claim 11, arranged to provide information relating to the placement of a hedging bet to reduce the worst case liability.

* * * * *